Mar. 27, 1923.
1,449,907
C. R. LUMLEY
STABILIZING AND ALIGNING DEVICE
Filed Nov. 12, 1921   2 sheets sheet 1
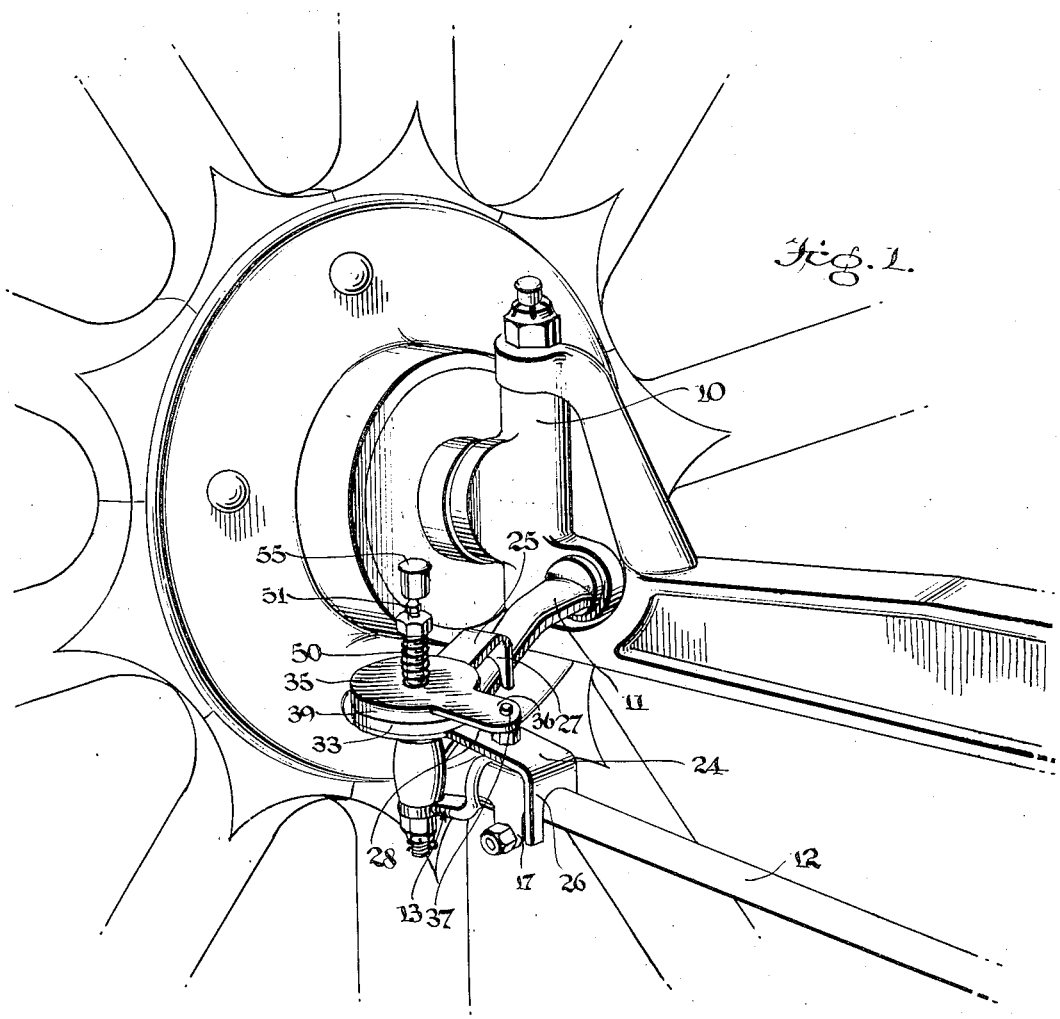
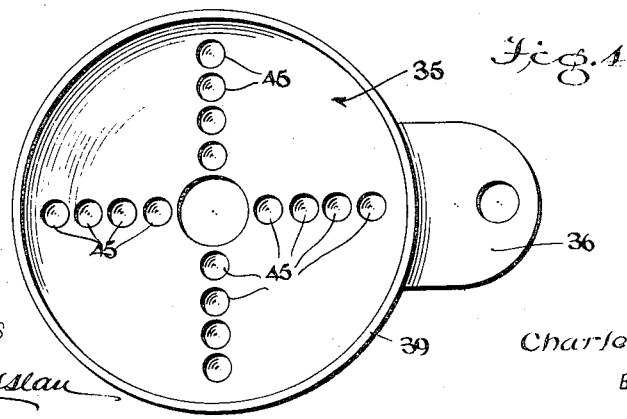
WITNESSES
INVENTOR
Charles R. Lumley,
BY
ATTORNEYS

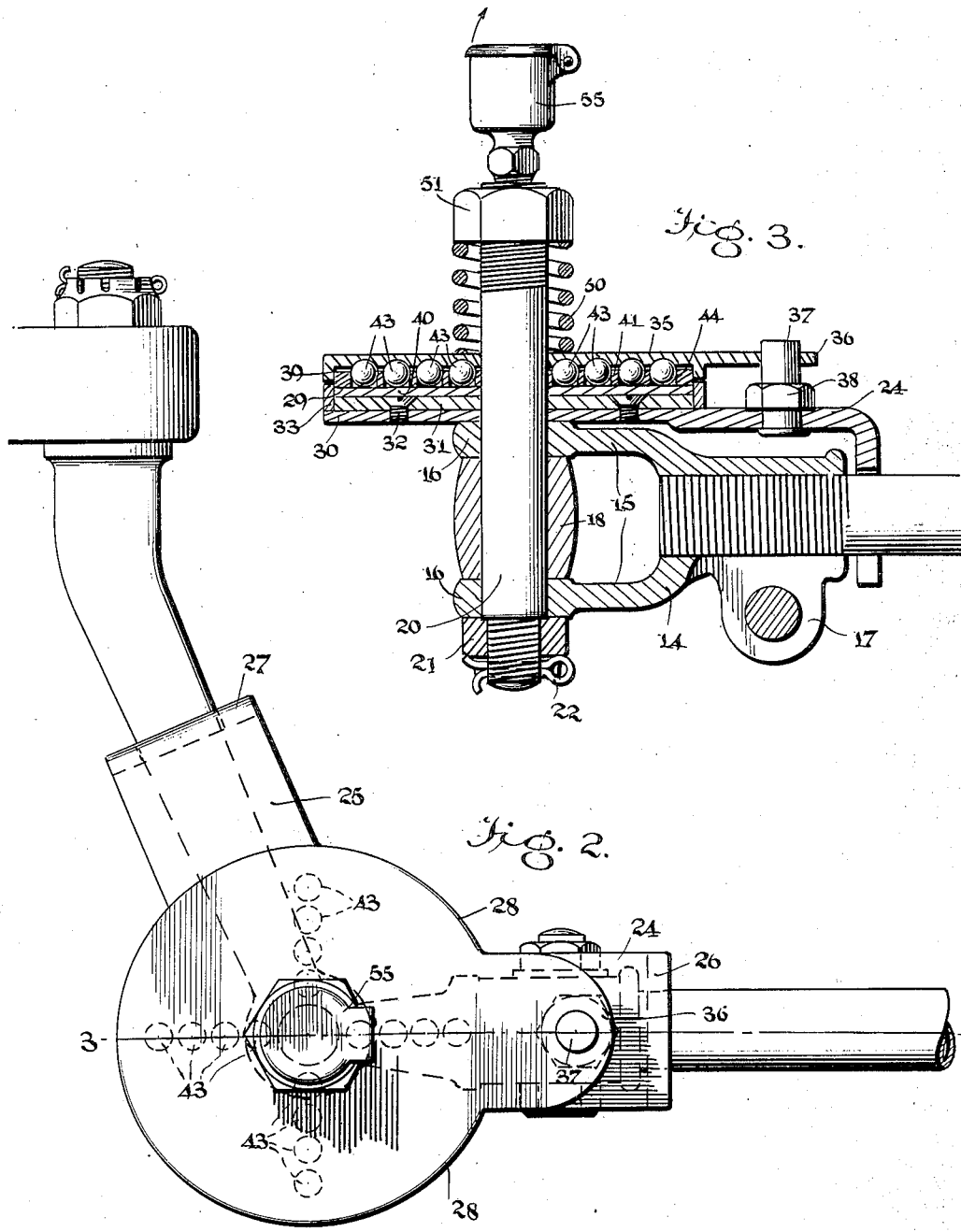

Patented Mar. 27, 1923.

1,449,907

UNITED STATES PATENT OFFICE.

CHARLES R. LUMLEY, OF ROSLYN, WASHINGTON.

STABILIZING AND ALIGNING DEVICE.

Application filed November 12, 1921. Serial No. 514,791.

*To all whom it may concern:*

Be it known that I, CHARLES R. LUMLEY, a citizen of the United States, and a resident of Roslyn, in the county of Kittitas and State of Washington, have invented certain new and useful Improvements in Stabilizers and Aligning Devices, of which the following is a specification.

This invention relates to an improvement in stabilizers and aligning devices especially adapted for use with the steering mechanisms of motor vehicles and the like.

The object of the invention is to provide a device of this character which intercepts, absorbs and opposes road shocks and vibrations, eliminates back-lash and causes the vehicle to maintain a true course over rough roads and around sharp curves.

Another object is to provide a device of this character which is of simple and durable construction, reliable, efficient in operation, capable of being properly lubricated while completely protected from the action of the weather and from the ingress of dust and foreign matter, possessed of a capacity for adjustment so as to be adaptable to the varying requirements incident to the functioning of a device of this kind and comparatively easy and inexpensive to manufacture and install.

Other objects and advantages of this invention reside in certain novel features of construction, combination and arrangement of parts which will be hereinafter more fully described and particularly pointed out in the appended claims, reference being had to the accompanying drawings forming part of this specification, and in which:

Figure 1 is a perspective view, illustrating the invention in use in the steering mechanism of a motor vehicle;

Figure 2 is a plan view of the invention applied, the associated parts of the steering mechanism being broken away;

Figure 3 is a view in transverse vertical section on line 3—3 of Figure 2; and Figure 4 is a bottom plan view of the friction cap plate.

Referring to the drawings wherein for the sake of illustration is shown the preferred embodiment of the invention, the numeral 10 designates the steering spindle of the steering mechanism of a motor vehicle. A steering arm 11 is associated with the steering spindle and the outer end of the arm is pivotally connected to the tie rod 12 by means of the connection, designated generally at 13, and including a yoke 14 having arms 15 provided with bearings 16 at their ends and a clamping sleeve 17 integrally formed with the yoke and engaging the threaded end of the tie rod. The outer end of the steering arm 11 is provided with a bearing 18 which is received between the arms 15 of the yoke and which is alined with the bearings 16 thereof. An elongated pivot bolt 20 is provided, and extends through the alined bearings 16 and 18 and serves also as the fixed shaft or axis upon which the stabilizer operates as will presently be described. The lower end of the pivot bolt 20 is reduced and threaded to receive a castellated nut which abuts the lower arm of the yoke 14 and which is locked in position by means of a cotter pin 22 extending through an opening provided therefor in the pivot bolt and engaging the crown of the castellated nut.

The stabilizer and aligning device which constitutes the present invention is mounted on the pivot bolt 20 above the upper arm of the yoke 14 and includes a pair of lever arms, designated at 24 and 25, respectively, and each having offset bifurcated attaching portions, designated at 26 and 27, respectively, and which respectively engage the steering arm 11, and the tie rod 12, as clearly shown in Figure 1. A pair of relatively movable friction members, designated generally at 28 and 29 are provided and are carried by lever arms 24 and 25, respectively.

The friction member designated generally at 28 preferably comprises a bed plate 30 integrally formed with the lever arm 24 and having a bearing plate 31 integrally formed with or secured to the upper side thereof by means of screws 32 counter sunk in the bearing plate 31. As shown in Figure 3 the under side of the bed plate is rotatably supported on the bearing 16 of the upper arm 15 of the yoke 14. A depending annular flange 33 is integrally formed with or otherwise secured to the marginal edge of the bed plate 40 of the member 29 to be hereinafter more fully described, and this flange extends down over the bearing plate 31 for a purpose which will be presently understood and be hereinafter more fully described. The friction member 28 also includes a friction cap plate 35 rotatably mounted on the pivot bolt 20 and having a laterally extending apertured lug 36 coacting with a stud 37 secured to the lever arm 24 by means of a nut 38 to constrain the friction cap plate to partake of the rotary motion of the bed plate 30 and bearing plate 31. The stud 37 extends slightly above the top cap plate, as shown in Figure 3, so as to be effective to constrain this cap plate to rotary motion with respect to the bearing plate while at the same time permitting these plates to move toward and away from each other. The friction cap plate 35 carries a depending flange 39 which is in vertical alinement with the flange 33 of the bed plate 40.

The friction member 29 is interposed between the bearing plate 31 and the cap plate 35 and it is housed by these plates and by the complementary flanges 33 and 39 of the bed plate and the cap plate. This friction member 29 comprises a bed plate 40 rotatably supported on the bearing plate 31 and having a ball retaining plate 41 secured to the upper side thereof and underlying the friction cap plate 35. The bed plate 40 is integrally formed with or otherwise secured to the lever arm 25 so as to partake of the motion thereof. A plurality of radial series of balls, designated at 43, are arranged in the sockets or cages 44 provided therefor in the ball retaining plate 41. The balls 43 project for a substantial distance above the ball retaining plate 41 and are normally received in depressions or seats 45 formed in the contiguous surface of the friction cap plate.

Means is provided for resiliently urging the friction cap plate 35 toward the friction member 29 so as to tend to maintain the series of balls 43 in the seats 45 of the cap plate and thereby to resiliently oppose relative motion between the members 28 and 29. This means preferably comprises a compression coil spring 50 encircling the pivot bolt above the friction cap plate and abutting this cap plate at its lower end. At its upper end the compression coil spring is engaged by a tensioning nut 51 having threaded engagement with the bolt 20 and adapted to vary the tension of the coil spring 50. A grease cup or lubricating device 55 is mounted on the upper end of the pivot bolt and serves as a means for lubricating the device.

In operation when the vehicle is travelling the road shocks tend to swing the front wheels out of alinement with the rear wheels and incidentally to swing the steering arms 11. This motion of the steering arm is opposed as the lever arm 25 is connected thereto and consequently imparts any motion of the steering arm to the friction member 29. If the friction member 29 turns it moves relative to the friction member 28 and the balls 43 which the ball retaining plate of the friction member 29 carries must move out of the seats 45. To partake of this motion these balls must displace the friction cap plate upwardly against the action of the coil spring 50, which increases the cohesion between the friction members 28 and 29, and after this friction cap plate has been displaced upwardly the balls must move against the frictional resistance occasioned by the pressure of the cap plate, thus the road shocks are absorbed and backlash is eliminated and the vehicle maintains a true course even over rough roads.

When steering the friction cap plate and the balls operate in the same manner to stiffen the steering mechanism, preserve alinement and absorb shocks.

I claim:

1. A stabilizer and aligning device for use with steering mechanisms including a steering arm, a tie rod and means for pivotally connecting the tie rod and steering arm including an elongated pivot bolt, a pair of lever arms having offset bifurcated attaching portions engaged with the steering arm and tie rod respectively, a pair of friction members carried by said lever arms, one of said friction members including a bed plate, a bearing plate secured to said bed plate, a friction cap plate having an apertured lug, a stud carried on one of said lever arms and loosely extending through the aperture of said lug, said friction cap plate and said bed plate having complementary flanges, the other of said friction members including a bed plate rotatably mounted on the bearing plate of the first friction member, a ball retaining plate secured to said last mentioned bed plate, a plurality of radial series of balls carried by said ball retaining plate, said friction cap plate having recesses receiving said balls, and means for resiliently urging the friction cap plate into engagement with said balls including a coil spring arranged on the pivot bolt and a tensioning nut threadedly connected with the pivot bolt and engaging said coil spring.

2. A stabilizer and aligning device for use with steering mechanisms including a steering arm, a tie rod and means for pivotally connecting the tie rod and steering arm including an elongated pivot bolt, a pair of lever arms having offset bifurcated attaching portions engaged with the steering arm and tie rod respectively, a pair of friction members carried by said lever arms, one of said friction members including a bed plate, a bearing plate secured to said bed plate, a friction cap plate having an apertured lug, a stud carried on one of said lever arms and loosely extending through the aperture of said lug, said friction cap plate and said bed plate having complementary flanges, the other of said friction members including a bed plate rotatably mounted on the bearing plate of the first friction member, a ball retaining plate secured to said last mentioned bed plate, a plurality of radial series of balls carried by said ball retaining plate, said friction cap plate having recesses receiving said balls, and means for resiliently urging the friction cap plate into engagement with said balls.

3. In a stabilizer and aligning device for use with steering mechanism including a steering arm and a tie rod and means for connecting the steering arms to the tie rod including an elongated pivot bolt, a pair of lever arms connected with the steering arm and tie rod respectively, coacting friction members carried by said lever arms, one of said friction members including a bed plate, a bearing plate secured to said bed plate, a friction cap plate, and means for constraining said cap plate and said bed plate to corresponding rotary motion while permitting said plates to move toward and away from each other, the other friction member being interposed between the bearing plate and the cap plate and comprising a bed plate rotatably mounted on the bearing plate and a ball retaining plate secured to said bed plate, series of balls carried by said ball retaining plate, said friction cap plate having depresisons normally receiving said balls, and means for resiliently urging said friction cap plate into engagement with said balls.

4. In a device of the character described, a pair of lever arms, a pair of friction members carried by said lever arms, one of said friction members including a bed plate, a bearing member secured thereto, a friction cap plate having an apertured lug, a stud connected with one of said lever arms and loosely extending through the aperture of said lug, the other of said friction members being interposed between the bearing plate and the cap plate and including a bed plate, a ball retaining plate secured to said bed plate, balls carried by said ball retaining plate and engageable with said friction cap plate, means for resiliently urging said resilient cap plate into engagement with said balls.

5. A stabilizer and aligning device for use with steering mechanisms including a steering arm, a tie rod and means for pivotally connecting the steering arm and tie rod including an elongated pivot bolt, a pair of lever arms connected with the steering arm and the tie rod respectively, coacting friction members carried by said levers, one of said friction members including a plate carrying a series of balls and the other of said friction members including a pair of plates, one of the plates of said pair having recesses constituting seats for said series of balls, the members of said pair of plates being constrained to partake of corresponding rotary movement but being movable toward and away from each other, and means for resiliently urging the members of said pair of plates toward each other and into frictional engagement with the first mentioned plate and the series of balls carried thereby.

6. In a device of the character described, a pair of lever arms, a pair of friction members carried by said lever arms, one of said friction members including a plate carrying a series of balls the other of said friction members including a pair of plates embracing the first named plate and the series of balls carried thereby, the members of said pair of plates being constrained to partake of the same degree of rotary motion while movable toward and away from each other, and means for resiliently urging the members of the pair of plates toward each other.

CHARLES R. LUMLEY.